(12) United States Patent
Vale

(10) Patent No.: US 7,421,666 B2
(45) Date of Patent: *Sep. 2, 2008

(54) BROWSER NAVIGATION FOR DEVICES WITH A LIMITED INPUT SYSTEM

(75) Inventor: Peter O. Vale, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 525 days.

This patent is subject to a terminal disclaimer.

(21) Appl. No.: 10/968,717

(22) Filed: Oct. 19, 2004

(65) Prior Publication Data

US 2005/0081149 A1    Apr. 14, 2005

Related U.S. Application Data

(63) Continuation of application No. 09/861,324, filed on May 18, 2001, now abandoned.

(51) Int. Cl.
*G06F 3/14* (2006.01)
*G06F 3/048* (2006.01)

(52) U.S. Cl. ............... 715/864; 715/785; 715/854

(58) Field of Classification Search ........... 715/785, 715/864, 273
See application file for complete search history.

(56) References Cited

U.S. PATENT DOCUMENTS

| | | | | |
|---|---|---|---|---|
| 5,677,708 A * | 10/1997 | Matthews et al. | ........... | 345/684 |
| 5,739,821 A | 4/1998 | Ho | | |
| 5,905,497 A | 5/1999 | Vaughan | | |
| 6,005,573 A * | 12/1999 | Beyda et al. | ........... | 715/784 |
| 6,061,063 A * | 5/2000 | Wagner et al. | ........... | 715/784 |
| 6,128,012 A | 10/2000 | Seidensticker | | |
| 6,310,634 B1 * | 10/2001 | Bodnar et al. | ........... | 715/854 |
| 6,778,192 B2 | 8/2004 | Arbab | | |
| 7,249,325 B1 * | 7/2007 | Donaldson | ........... | 715/777 |

(Continued)

FOREIGN PATENT DOCUMENTS

EP    0561684    9/1993

(Continued)

OTHER PUBLICATIONS

Marran, N.L., Over-The-Air Subscriber Device Management Using CDMA Data and WAP, Virginia Tech, 1999, pp. 165-174.

(Continued)

*Primary Examiner*—William L. Bashore
*Assistant Examiner*—Stephen Alvesteffer
(74) *Attorney, Agent, or Firm*—Workman Nydegger

(57) ABSTRACT

Methods, system, and computer program products for browsing content with a display area and input system that may be limited in comparison to more traditional browsing systems. Movement between and selection of interactive elements generally occurs in a navigation mode, whereas interaction with a single interactive element generally occurs in an edit mode. In navigation mode, a direction input selects the next interactive element in the direction indicated. If no interactive element is at least partially visible in the direction indicated or if a selected interactive element is only partially visible, the display scrolls. Switching between navigation mode and edit mode is based on the input received, in view of the input supported, by a particular interactive element. Interactive elements may be limited to the width of available display area.

21 Claims, 12 Drawing Sheets

U.S. PATENT DOCUMENTS

| | | | |
|---|---|---|---|
| 2001/0022839 A1 | 9/2001 | Ishigaki | |
| 2002/0070980 A1 | 6/2002 | Le | |
| 2002/0112237 A1 | 8/2002 | Kelts | |
| 2002/0145631 A1* | 10/2002 | Arbab et al. | 345/786 |
| 2005/0022140 A1 | 1/2005 | Vale | |

FOREIGN PATENT DOCUMENTS

WO      WO 98/29797      7/1998

OTHER PUBLICATIONS

Ming, Tham and Chaun, Tan Kay, Challenges in Designing User Interfaces for Handheld Communication Devices: A Case Study, Lawrence Erlbaum Assocaites; 1999, pp. 808-812.

Fox, A.; Goldberg, I.; Gribble, S.D.; Lee, D.C.; Polito, A.; and Brewer, E.A., Experience With Top Gun Wingman: A Proxy-Based Graphical Web Browser for 3Com PalmPilot, University of California at Berkeley, 1998, pp. 407-424.

Gessler, Stefan and Kotulla, Andreas, PDAs as Mobile WWW Browsers, Germany 1995, pp. 53-59.

Office Action mailed May 31, 2007, cited in related U.S. Appl. No. 10/923,438.

Kawachiya, Kiyokuni, et al., "NaviPoint: An Input Device for Mobile Information Browsing", Human Factors in Computing Systems. Conference Proceedings, Los Angles, California, Apr. 18-23, 1998.

Notice of Allowance dated May 14, 2008 cited in related U.S. Appl. No. 10/923,438 (Copy Attached).

Motorola, Digital Wireless Telephone, Model 120c, the User Guide, p. 35, 2001.

* cited by examiner

BROWSER NAVIGATION FOR DEVICES WITH A LIMITED INPUT SYSTEM

CROSS-REFERENCE TO RELATED APPLICATIONS

The present application is a continuation application of commonly-assigned U.S. patent application Ser. No. 09/861,327 filed May 18, 2001, entitled "Browser Navigation for Devices with a Limited Input System". That patent application claims priority to U.S. Provisional Application No. 60/239,600, entitled, "BROWSER NAVIGATION FOR DEVICES WITH LIMITED INPUT MECHANISMS," filed Oct. 11, 2000, both of which are incorporated herein by reference.

BACKGROUND OF THE INVENTION

1. The Field of the Invention

The present invention relates to browsing electronic content. More specifically, the present invention relates to methods, systems, and computer program products for browsing content that includes interactive elements using a computerized system with a display area and input system that may be somewhat limited in comparison to the pointing devices and displays typically found in more traditional browsing systems.

2. Background and Relevant Art

Content typically includes interactive elements, such as links and form controls. Activating or following a link causes the content that is associated with the link to be requested and displayed. Selecting a form control allows for interaction with the form control. Traditional browsing systems generally include a keyboard and a pointing device such as a mouse, for activating links and interacting with form controls. Tab order navigation is possible, but may not follow an order expected by the user, especially if scrolling is required to view all of the content.

In traditional browsing systems, a user activates a link or selects a form control by simply placing a mouse pointer over the interactive element and pressing a mouse button. With each mouse press, a user may follow a link, select a text field so that text may be entered from a keyboard, toggle a radio button or checkbox, choose one or more items from a list, or cause the action associated with a button to be executed. The mouse also is used in scrolling the display area, as necessary. Nevertheless, content often is authored to minimize scrolling the display of traditional browsing systems, particularly in the horizontal direction.

Browsing systems with limited input systems and display areas, however, such as a phone having a numeric keypad, a directional control, and an action key, may make it difficult to select and interact with content designed for more traditional browsing systems that make use of pointing devices and have larger display areas. For example, without a pointing device, how are links activated and how are form controls selected? The direction control is a natural choice for scrolling because this operation is similar to many traditional browsing systems. (When no interactive element is selected, arrow keys usually are used for scrolling.) But, without a mouse, selecting individual interactive elements presents a significant challenge.

Tab order navigation does not provide an adequate solution because tab order generally follows the order of interactive elements in the content as authored or written, rather than the order of interactive elements in the content as displayed. Thus, in some situations, tab order moves horizontally, and in other situations, tab order moves vertically. For example, content that includes a table often will have a vertical tab order within individual table cells, but a horizontal tab order from cell to cell. Content outside of a table usually has a horizontal tab order. Because users generally are unaware of whether content includes a table or not, tab order may appear completely arbitrary, moving horizontally one time and vertically the next.

Therefore, when browsing content that includes interactive elements, methods, systems, and computer program products are needed for computerized systems that may have limited display areas and input systems, as compared to the pointing devices and displays typically found in more traditional browsing systems. Furthermore, certain interactive elements may be more intuitive in a browsing context, if those interactive elements operate somewhat differently from how they might function in an operating system shell environment.

BRIEF SUMMARY OF THE INVENTION

The present invention provides a navigation mode and an edit mode for browsing content with a computerized system that may include a somewhat limited display area and/or input system. Navigation mode generally includes movement between and selection of interactive elements, whereas the edit mode generally includes interaction with a single interactive element. In navigation mode, pressing a direction key selects the next interactive element in the direction indicated by the direction key (e.g., up, down, left, right). When moving horizontally, an interactive element is in the direction indicated by the direction control if the interactive element is at substantially the same vertical level. For example, if a later element overlaps a previous element on a given vertical level by any amount, the two elements are considered to be at substantially the same vertical level. Vertical movement is to an interactive element at the next vertical level in the direction indicated by the direction control. If multiple interactive elements lie at the next vertical level, the one closest in the horizontal direction to the beginning of the current interactive element is selected.

To indicate selection, an interactive element is highlighted, such as by placing a selection box around the element. The interactive element remains selected until it is no longer visible (i.e., it has scrolled off the display area) or the next interactive element becomes at least partially visible and is selected. If no interactive element is at least partially visible in the direction indicated or if a selected interactive element is only partially visible, the display scrolls in the direction indicated by the direction control.

Switching from navigation mode to edit mode may be accomplished in several ways. For example, once an interactive element allowing character entry is selected, typing a character on the keypad automatically switches from navigation mode to edit mode. Similar to a mouse click, pressing the action button after an interactive element has been selected also switches to edit mode. Where interactive elements only require a mouse click to function in traditional browsing systems, such as links, checkboxes, radio buttons, other buttons, and the like, pressing action uses the selected control (i.e., follows the link, checks or unchecks a checkbox, chooses a radio button, performs the action associated with the button, etc.) rather than switching to edit mode. In edit mode, pressing the action button switches back to navigation mode. If a particular direction key is not allowed in edit mode, pressing the direction key also will exit edit mode. For forms that do not include a submit button on the form, pressing the action key will submit the form, rather than switching to navigation mode.

Certain interactive elements may be limited to the width of the display area that is available for displaying content so that the entire element can be visible at one time. Therefore, the width of an interactive element that exceeds the width of available display area may be adjusted to be less than or equal to the width of available display area. If a selected interactive element is only partially visible, switching into edit mode scrolls the control into full view.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

Figure 1:
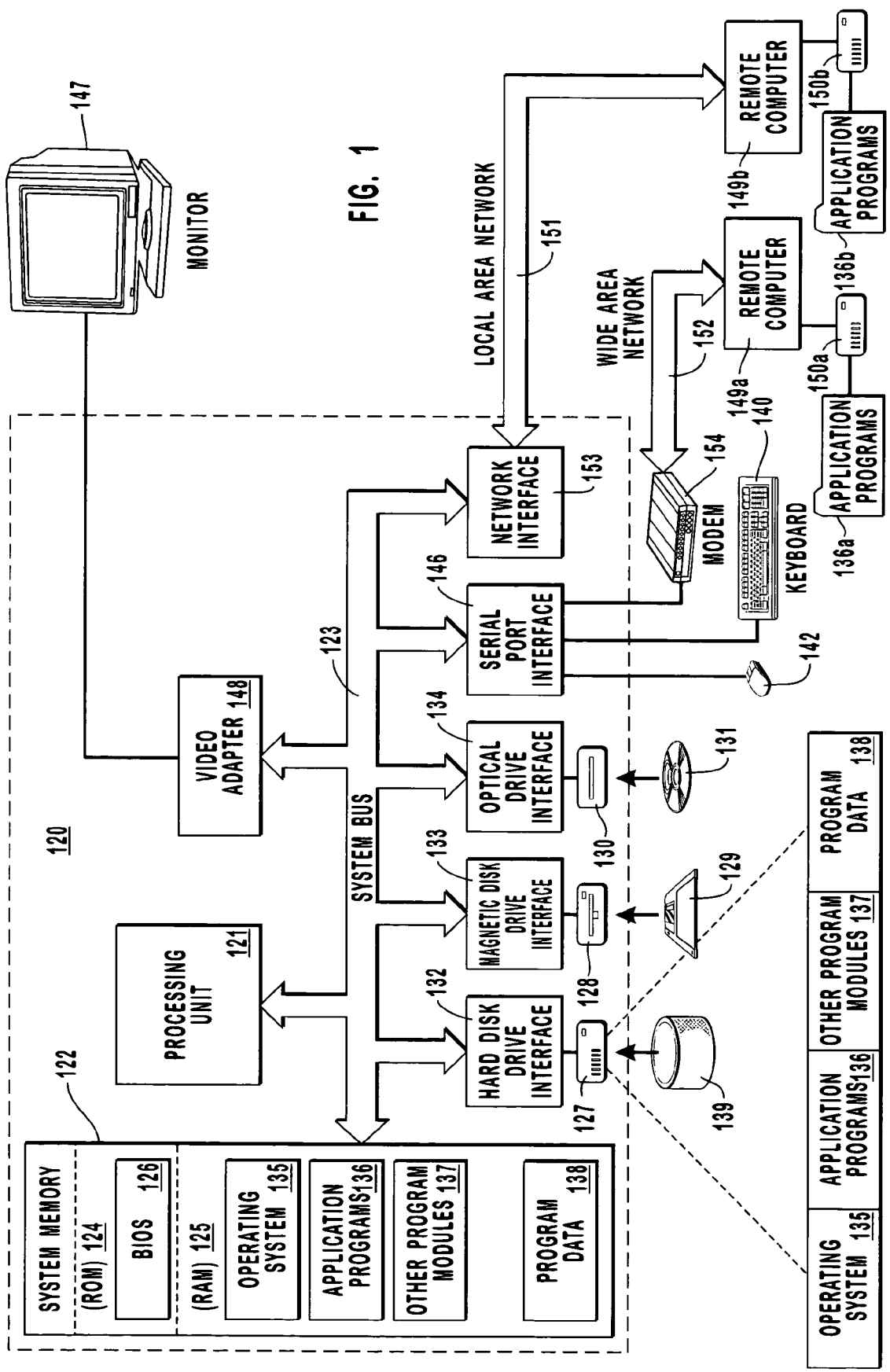
FIG. 1 illustrates an exemplary system that provides a suitable operating environment for the present invention.

The present invention extends to methods, systems, and computer program products for browsing content that includes interactive elements using a browsing system with a display area and input system that may be limited in comparison to the pointing devices and displays typically found in more traditional browsing systems. As used in this application, the term "browsing system" should be interpreted broadly to encompass any computerized system for locating and presenting content, including text, images, audio, video, computer instructions, and the like. With the popularity of the World Wide Web ("Web"), content frequently is formatted using hypertext markup language ("HTML") and computer instructions often are embedded in content using Javascript. Both HTML and Javascript allow for the creation of interactive elements within content.

Those of skill in the art, however, will recognize that a wide variety of markup and scripting languages exist. In particular, extensible markup language ("XML") is becoming increasingly popular because it allows for user-defined extensions to the language. Note also that content may be converted from one language to another. Furthermore, it is anticipated that additional formats, languages, technology and/or standards for authoring content with interactive elements will become available in the future. The present invention, therefore, does not impose any requirements on how content with interactive elements is authored, whether based on current or future technology. Thus, any reference to HTML and/or Javascript, either explicit or implied, should be interpreted as exemplary of aspects or embodiments of the present invention and not as limiting its scope.

Those skilled in the art also will appreciate that the invention may be practiced in network computing environments with many types of computer system configurations, including personal computers, mobile/hand-held devices, such as personal digital assistants ("PDAs") and wireless telephones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media that may be accessed by a general purpose or special purpose computer. By way of example, and not limitation, such computer-readable media may comprise RAM, ROM, EEPROM, flash memory, CD-ROM or other optical disk storage, magnetic disk storage or other magnetic storage devices, or any other medium which can be used to oak carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention may be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

With reference to FIG. 1, an exemplary system for implementing the invention comprises a general purpose computing device in the form of a generic computer 120, including a processing unit 121, a system memory 122, and a system bus 123 that couples various system components including the system memory 122 to the processing unit 121. Although some components of computer 120, such as monitor 147, keyboard 140, and mouse 142, may seem specific to a conventional computer, those of skill in the art will recognize that analogous components may be found in other computing devices. For example, wireless telephones often include an LCD or plasma display area, a numeric keypad, and one or more navigation buttons. Therefore, any component described with reference to generic computer 120 should be interpreted broadly to encompass analogous components that are appropriate for and consistent with a particular implementation or embodiment of the present invention. In some implementations, a component may be connected only intermittently or may be missing entirely.

The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like. Note that decreasing form factors are making it practical to use at least some of the foregoing components with mobile devices. Furthermore, it is anticipated that future technological advances with respect to size, power consumption, and the like, will lead to an increased selection of storage options.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a numeric keypad, directional buttons, pressure-sensitive software keyboard, microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device, such as an LCD or gas plasma display, is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
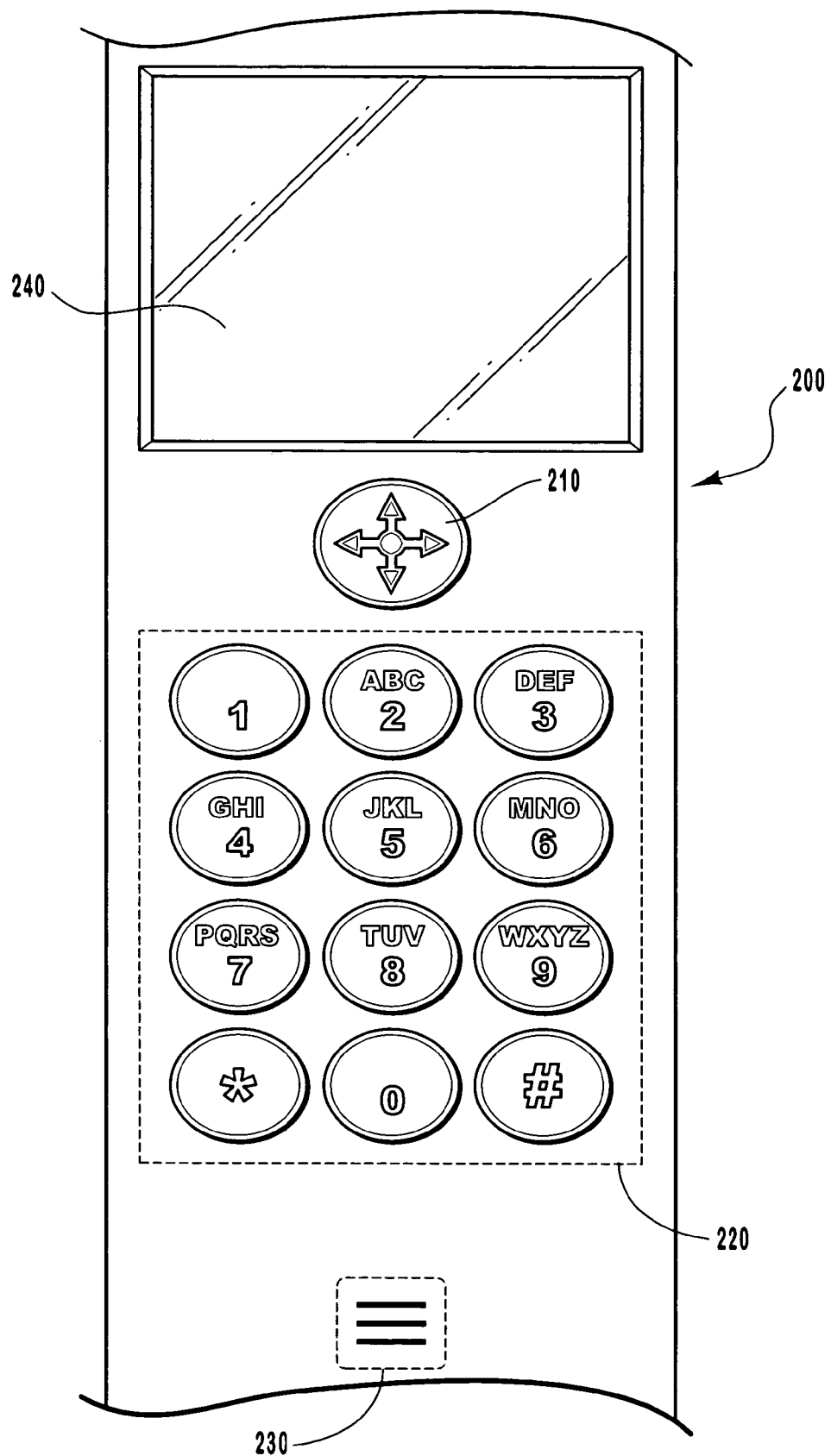
FIG. 2 shows a portion of a wireless telephone.

FIG. 2 shows a portion of a wireless telephone. A wireless telephone is merely one example of a browsing system with limited display and input capabilities. Typically, PDAs and other handheld devices also have limited displays and input systems. The present invention, however, is not necessarily limited to any particular hardware or device, handheld or otherwise. Nevertheless, some benefits provided by the present invention may be more pronounced where displays and/or input systems are less robust than corresponding displays and/or input systems found in traditional browsing systems.

Four-direction and action key 210 is an example of both a navigation key generating direction input and an action key providing action input. Depressing key 210 at any one of the four arrows generates a direction input corresponding to the direction of the arrow. An action input is generated by depressing the center of key 210. The center of key 210 may be a separate button (not shown) or may be integral with the navigation arrows such that depressing the center generates simultaneous, but conflicting direction input. In other words, simultaneous up and down arrows or simultaneous left and right arrows are interpreted as an action input. Typically, an action input corresponds to pressing an enter key on a keyboard, but other actions are not precluded, as circumstances may warrant.

A user may enter characters, such as numbers, letters, punctuation, etc., with keypad 220. Audio input 230 is the mobile telephone's mouthpiece. Display area 240 displays content received while browsing. Note however, that all of display area 240 may not be available for displaying content. For example, portions of display area 240 may be used for titles, menus, switching between tasks, etc. Therefore, available display area generally refers to the portion of display area 240 that is devoted to displaying content, and may represent all or less than all of display area 240.

As noted previously, the present invention provides for a navigation mode and an edit mode. Edit mode generally is characterized by interaction with a single interactive element and is described more fully in connection with FIG. 6 and the interactive elements shown in FIGS. 5A-5H. In contrast, navigation mode generally is characterized by movement between and selection of interactive elements (i.e., changing focus from one interactive element to another) and is described more filly in connection with FIGS. 3 and 4. Transitions from navigation mode to edit mode and interactive elements that operate in an intuitive manner without using a dedicated edit mode are covered in the description of FIGS. 7 and 8.

Figure 3:
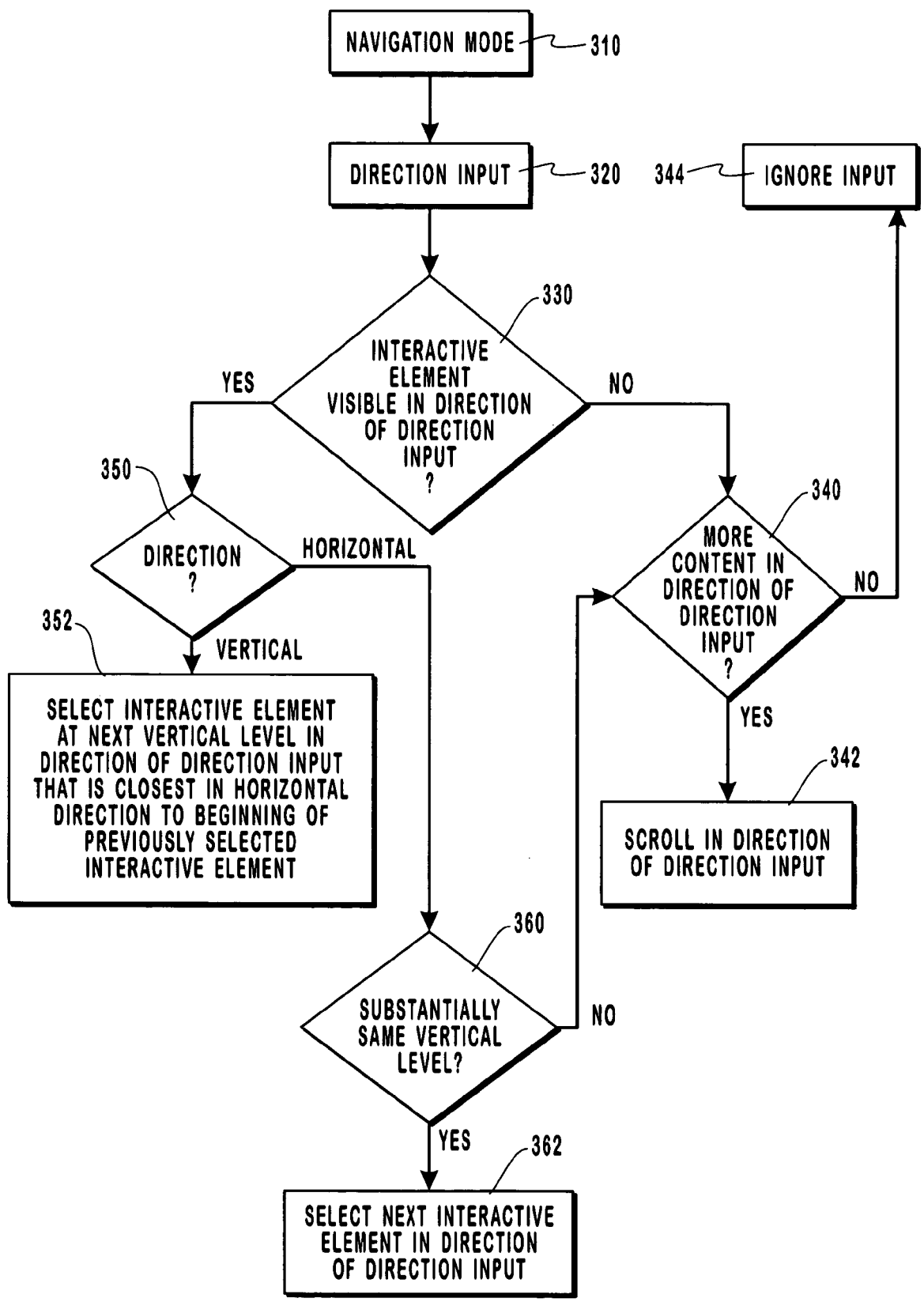
FIG. 3 is a flow diagram that corresponds to receiving a direction input while navigating between interactive elements.

Turning first then to FIG. 3, during operation in navigation mode 310, a direction input 320 is received. Decision block 330 determines if an interactive element is at least partially visible in the direction of direction input 320, either relative to the beginning of the content if no interactive element has been selected or relative to an interactive element that is selected currently. If no interactive element is visible in the direction of the direction input, decision block 340 determines if more content is available in the direction of the direction input. If more content is available in the direction of the direction input, the display scrolls 342 in the direction of the direction input; otherwise, the direction input is ignored 344.

Returning to decision block 330, if an interactive element is visible in the direction of direction input 320, selecting the next interactive element depends on the direction of direction input 320, unless no interactive element has been selected previously, wherein the interactive element closest to the beginning of the content is selected (not shown). For horizontal input, decision block 360 determines if the visible interactive element lies at substantially the same vertical level as the interactive element that is selected currently. (The meaning of substantially the same vertical level will be described in more detail below, with respect to FIG. 4.) If substantially at the same level, the interactive element in the direction of the direction input is selected 362. If the visible interactive element does not lie at the substantially the same vertical level, operation continues with decision block 340, as described above. For vertical direction input, the interactive element at the next vertical level in the direction of direction input 320 that is closest in the horizontal direction to the beginning of the previously selected interactive element is selected 352.

Figure 4:
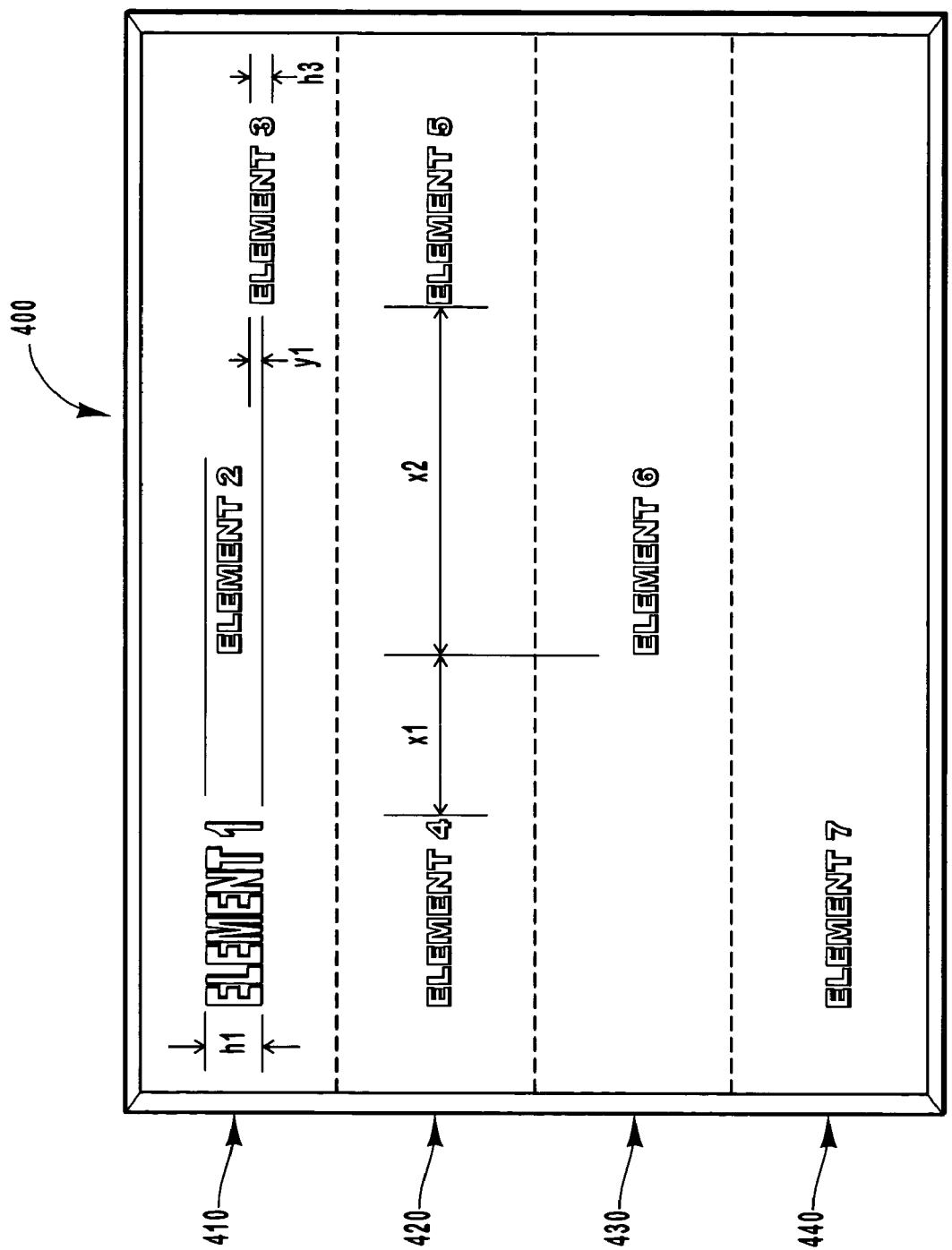
FIG. 4 shows several interactive elements and their positions relative to each other for use in describing the selection of interactive elements during navigation.

FIG. 4 shows several interactive elements and their positions relative to each other for use in describing the selection of interactive elements during navigation. The display 400 of content includes vertical levels 410, 420, 430, and 440. Note that at vertical level 410, Element 1, Element 2, and Element 3 do not display at exactly the same vertical coordinates. Nevertheless, Element 1, Element 2, and Element 3 lie at substantially the same vertical level. By allowing for some variation in the vertical display coordinates for interactive elements, navigation is more intuitive.

In particular, the height of Element 1 is h1 and the height of Element 3 is h3. The distance y1 is the amount that Element 3 overlaps with Element 1. Alternatively, y1 may represent the amount of vertical separation between interactive elements rather than the amount of overlap. Note that the present invention does not necessarily limit y1 to any particular dimension or calculation. Because y1 reflects the expectations of users, it is possible for y1 to take on a wide range of values, as may be suitable for a particular embodiment or implementation. However, in at least some circumstances, y1 is a portion of h3, the height of Element 3, indicating that Element 3 partially overlaps Element 1. (Although not shown, note also that it may be possible for a single element to span and be reachable from multiple vertical levels. When navigating horizontally from an element spanning multiple vertical levels, the next element is selected from the top most spanned vertical level where an interactive element is visible.) The height of Element 2 is not shown because it overlaps completely with Element 1 and therefore is clearly at the same vertical level as Element 1.

Initially no interactive element is selected. As indicated with respect to FIG. 3, a direction input that is not in the direction of an interactive element that is at least partially visible or in a direction that permits scrolling will be ignored (see block 344). Thus, direction input up or to the left will be ignored. Because initially no interactive element is selected, however, a down direction input or a right direction input will select Element 1 (i.e., the first interactive element relative to the beginning of the content). Once selected, an interactive element is highlighted, such as by drawing a dashed box around the element to indicate that the selected interactive element has focus. The present invention does not necessarily limit the type of highlighting used to indicate selection. It is only relevant for some form of visual cue to occur that is specific to the selected interactive element.

Left and right direction input will select interactive elements in numerical order, either ascending for right direction input or descending for left direction input. Up and down direction input is somewhat more complicated. Beginning with Element 1, down direction input selects interactive elements in the following order: Element 1, Element 4, Element 6, Element 7. Beginning with Element 7, up direction input selects interactive elements in reverse order: Element 7, Element 6, Element 4, Element 1.

Moving from vertical level 430 to vertical level 420 may include some ambiguity because vertical level 420 includes multiple interactive elements. Selecting between Element 4 and Element 5 depends on the horizontal distances labeled x1 and x2. The distance x1 represents the horizontal distance from the beginning of Element 6 (the currently selected interactive element when moving from vertical level 430 to vertical level 420) to the nearest portion of Element 4. Likewise, the distance x2 represents the horizontal distance from the beginning of Element 6 to the nearest portion of Element 5. When selection moves in the vertical direction and more than one interactive element lies at a vertical level, the interactive element closest in the horizontal direction to the beginning of the previously selected interactive element is selected next. In other words, Element 4 is selected if x1 is less than or equal to x2, and Element 5 is selected if x2 is less than x1. Note that the same processing occurs for moving between Element 1 and Element 4, but the result is obvious. In contrast, there is no ambiguity in moving from Element 4 to Element 6 and then to Element 7.

FIGS. 5A-5H illustrate various interactive elements, the operation of which will be described in greater detail with respect to FIGS. 6-8. Those of skill in the art will recognize that the interactive elements shown in FIGS. 5A-5H are merely exemplary of interactive elements that are useful in describing embodiments of the present invention in the context of HTML content. However, as explained previously, the present invention is not necessarily limited to any particular types of interactive elements or any particular type of content. For example, JAVA and Javascript allow for the creation of interactive elements and show that the types of interactive elements within the scope of the present invention are governed only by the creativity of those who author content. In addition to existing interactive elements, therefore, it is fully anticipated that new interactive elements will be developed and should be considered to fall within the meaning of interactive elements as used in this application, regardless of the particular technology that implements and/or deploys a particular interactive element. Furthermore, it should be apparent that the following discussion does not catalog all existing interactive elements, but rather, identifies a sufficient number to adequately describe how the present invention operates.

Figure 5A:
FIGS. 5A-5H illustrate various interactive elements.
Figure 5B:
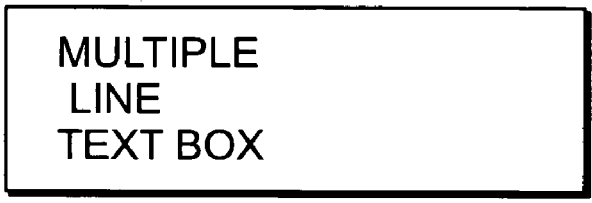

FIG. 5A illustrates single line textbox 510 for entry of characters. Although display is limited to a single line, characters within the textbox may allow for scrolling if character entry exceeds the width of textbox 510. FIG. 5B illustrates multiple line textbox 520. Multiple line textbox 520 is also for character entry. Due to display area constraints, multiple line textbox 520 may display as a single line in navigation mode, and then to facilitate editing, expand to a multiple line display in edit mode. A close button may be included with multiple line textbox 520 to assist in returning to navigation mode. Like single line textbox 510, multiple line textbox 520 may allow for scrolling if character entry exceeds the width of textbox 520.

Figure 5C:
Figure 5D:
Figure 5E:
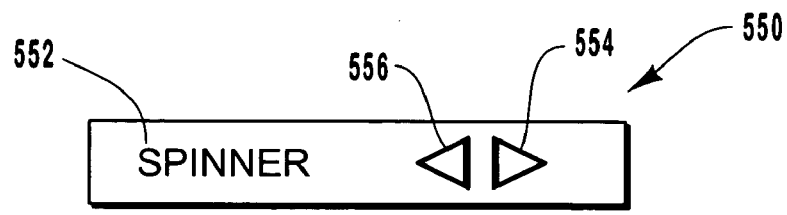
Figure 5F:
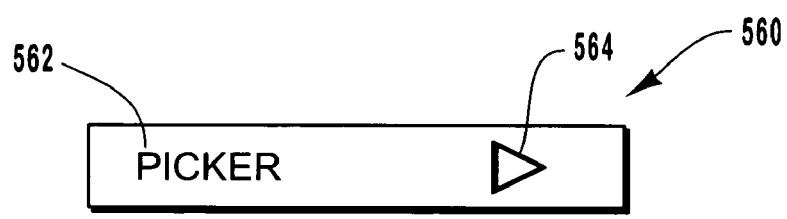
Figure 5G:
Figure 5H:
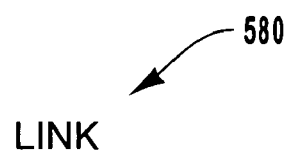

Radio button 530, with button 532 and text 534, is illustrated in FIG. 5C. Radio buttons allow for choosing one item and only one item from a group or list of items. FIG. 5D illustrates checkbox 540, with button 542 and text 544. In contrast to radio button 530, checkbox 540 allows for selecting zero or more items from a group or list of items. FIG. 5E illustrates spinner 550, with text 552, left arrow 556, and right arrow 554. Similar to radio buttons, spinner 550 groups related items and allows one and only one to be chosen. Activating left arrow 556 chooses the previous item in the list and activating right arrow 554 chooses the next item in the list. The list may be circular, such that moving through all choices with either arrow returns to the initial choice. Alternatively the list may be linear, having a starting point that may be reached with left arrow 556 and having an ending point that may be reached with right arrow 554. Picker 560, with text 562 and right arrow 564, as illustrated in FIG. 5F, is similar to checkbox 540. Activating right arrow 564 displays a list of checkbox options. Like multiple line textbox 520, a close button may be included with picker 560 to facilitate returning to navigation mode. Activating button 570 of FIG. 5G causes an action associated with the button to be executed. FIG. 5H illustrates link 580, a hypertext markup language link that browses content associated with the link when the link is activated or followed.

Figure 6:
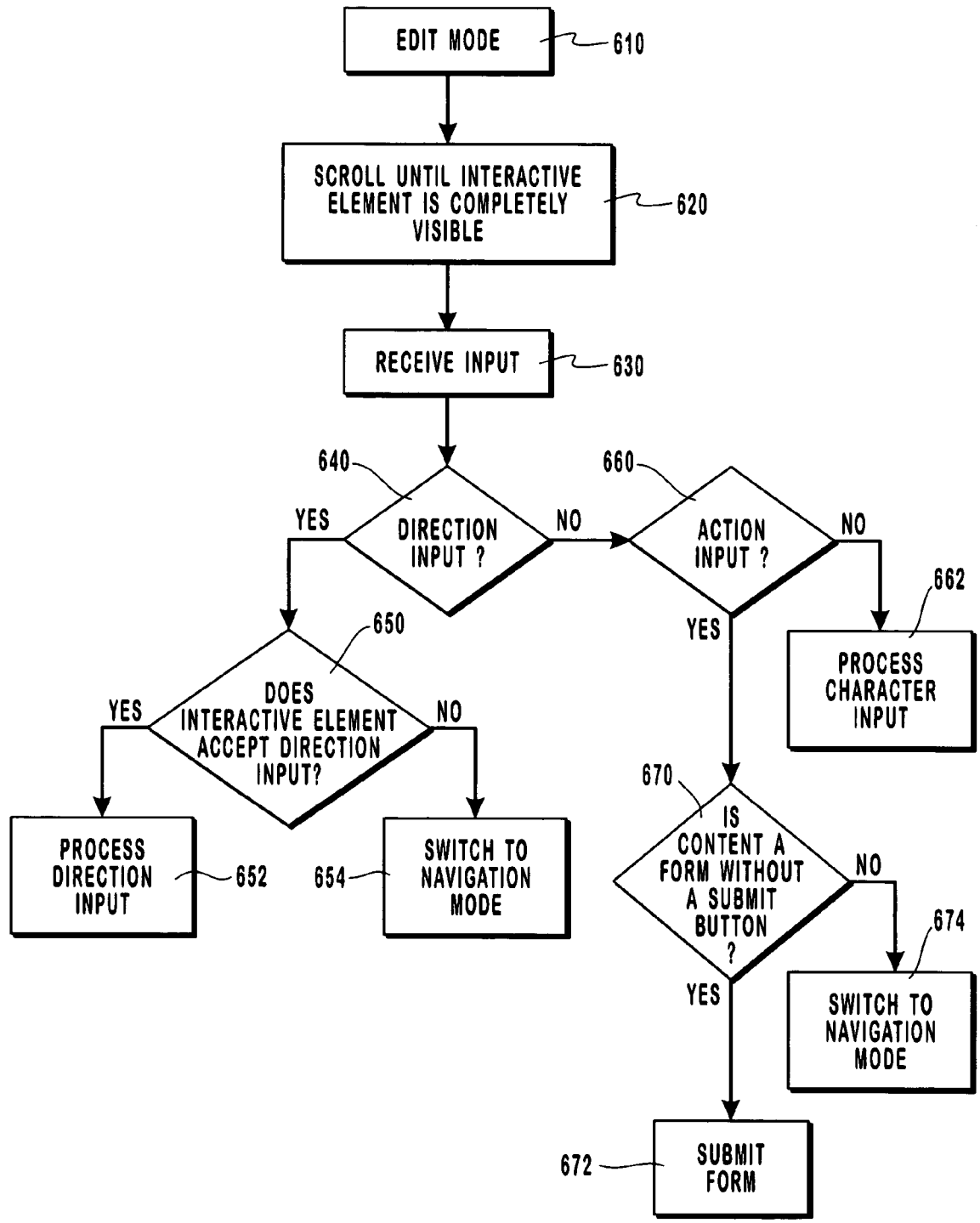
FIG. 6 is a flow diagram that corresponds to receiving input while editing interactive elements.

FIG. 6 is a flow diagram that corresponds to receiving input while editing a selected interactive element, such as one of those described above in connection with FIGS. 5A-5H. Depending on the selected interactive element, input received while in edit mode may be used by the interactive element (e.g., entering characters into a textbox) or may cause a return to navigation mode (e.g., so that another interactive element may be selected). Following the discussion of edit mode and FIG. 6, the description of FIGS. 7 and 8 explains how transitions to edit mode are made from the navigation mode identified above, with respect to FIGS. 3 and 4.

Turning now then to FIG. 6, during operation in edit mode 610, an input 630 is received. If the selected interactive element is only partially visible, entering edit mode will scroll 620 the display until the selected element is completely visible. Decision block 640 determines if input 630 is a direction input. If so, decision block 650 determines if the selected interactive element accepts direction input so that the direction input may be processed 652. For example, direction input may be accepted in single line textbox 510 and multiple line textbox 520 for moving the cursor position, although up and down direction input would not be accepted by single line textbox 510. Spinner 550 also may accept direction input, with a left direction input choosing a previous item in the spinner list and a right direction input choosing the next item in the spinner list. If decision block 650 determines that the selected interactive element does not accept direction input, operation transitions or switches to navigation mode 654.

If input 630 is not a direction input, decision block 660 determines if input 630 is an action input. If not, input 630 is processed as character input 662. Note that FIG. 6 suggests three basic types of input: direction input, action input, and character input. However, the present invention does not necessarily require dividing all input into any particular number of categories. It is expected, therefore, that alternate embodiments may use additional, fewer, or other categories, depending on the needs or preferences of a particular application. Furthermore, alternate embodiments also may include additional, fewer, or other modes of operation, again depending on the needs or preferences of the particular application.

Processing character input depends on the selected interactive element. Ordinarily, character input has greatest application in entering information into single line textbox 510 and multiple line textbox 520. However, character input also may be used in finding a particular entry in spinner 550 and picker 560. For example, if spinner 550 or picker 560 are used to chose a state based on state codes, entering a "W" may immediately move to the end of the list, as opposed to moving through a list item by item or page by page as would likely occur using a direction input.

If decision block 660 determines that input 630 is an action input, decision block 670 considers whether the content being browsed is form content without a submit button. Some form content may fail to provide an explicit submit button, in which case an action input is interpreted as a request to submit the form 672. In the usual case, however, an action input switches from edit mode back to navigation mode 674. For spinner 550, switching from edit mode to navigation mode 674 is somewhat different behavior than occurs in an operating system shell context. More specifically, in an operating system shell context, once a spinner has been selected, an action input ordinarily displays a list of radio button options.

Figure 7:
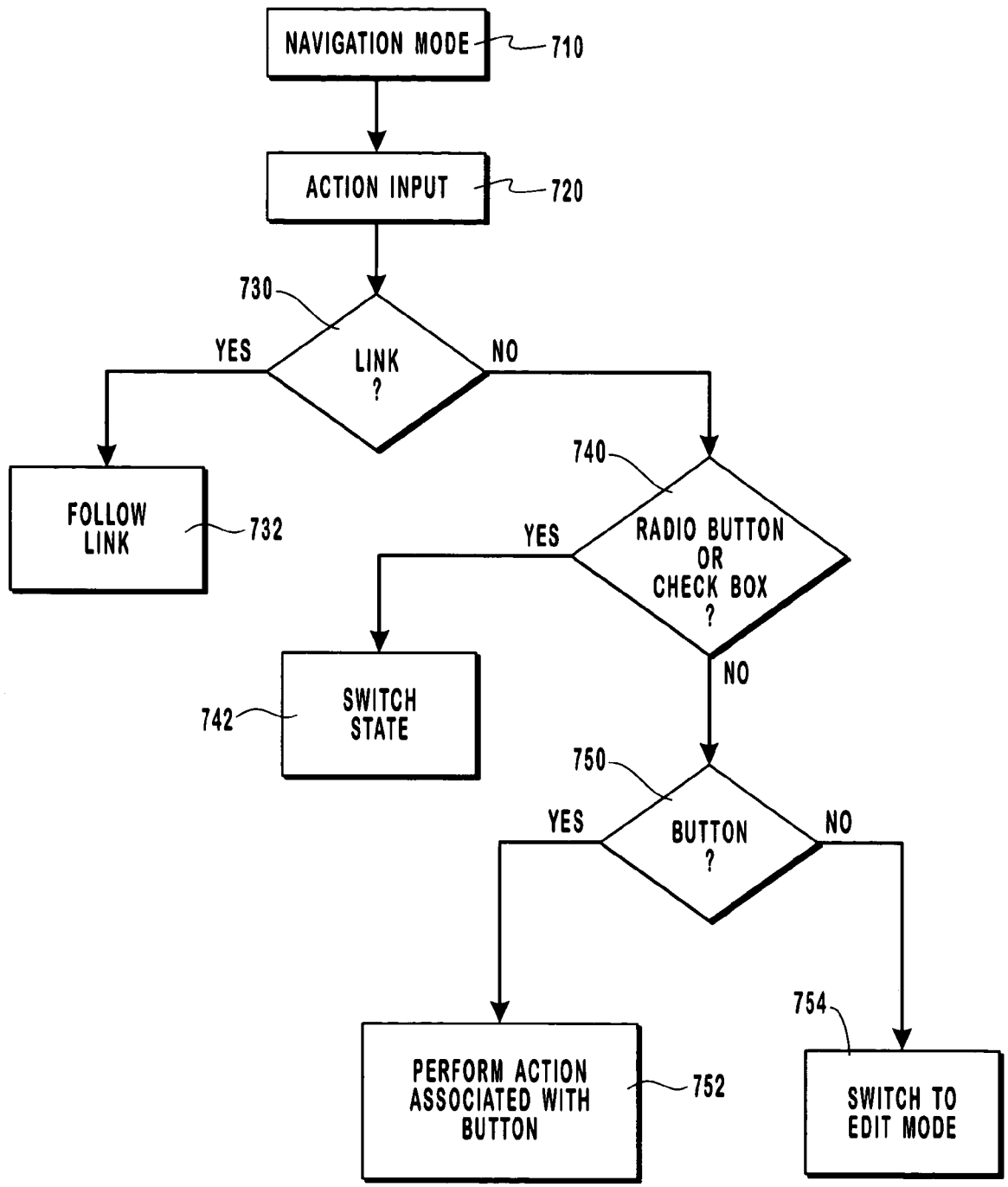
FIG. 7 is a flow diagram that corresponds to receiving an action input while navigating between interactive elements.

FIG. 7 is a flow diagram that corresponds to receiving an action input while navigating between interactive elements. During operation in navigation mode 710, an action input 720 is received. If decision block 730 determines that the selected interactive element is a link, receiving an action input activates or follows the link 732. If the selected interactive element is a radio button or checkbox, as determined in decision block 740, the state of the radio button or checkbox is switched. Radio buttons and checkboxes are both examples of interactive elements capable of representing two states.

Because multiple checkboxes may be chosen, switching the state of a checkbox means either (i) an unchecked checkbox is checked, or (ii) a checked checkbox is unchecked. Radio buttons are slightly more complex to explain since only one item may be chosen at any given time. Therefore, switching the state of a radio button means that (i) if the radio button was not chosen previously, the radio button will be chosen and any other radio button that may have been chosen previously will no longer be chosen, or (ii) a radio button that was previously chosen remains chosen.

If the selected interactive element is a button, as determined in decision block 750, the action associated with the button is executed or performed 752 upon receiving an action input 720. Note that links, radio buttons, checkboxes, and buttons are examples of interactive elements that operate in an intuitive manner without using a dedicated edit mode. For other interactive elements, such single line textbox 510, multiple line textbox 520, spinner 550, and picker 560, an action input switches to edit mode 754.

Figure 8:
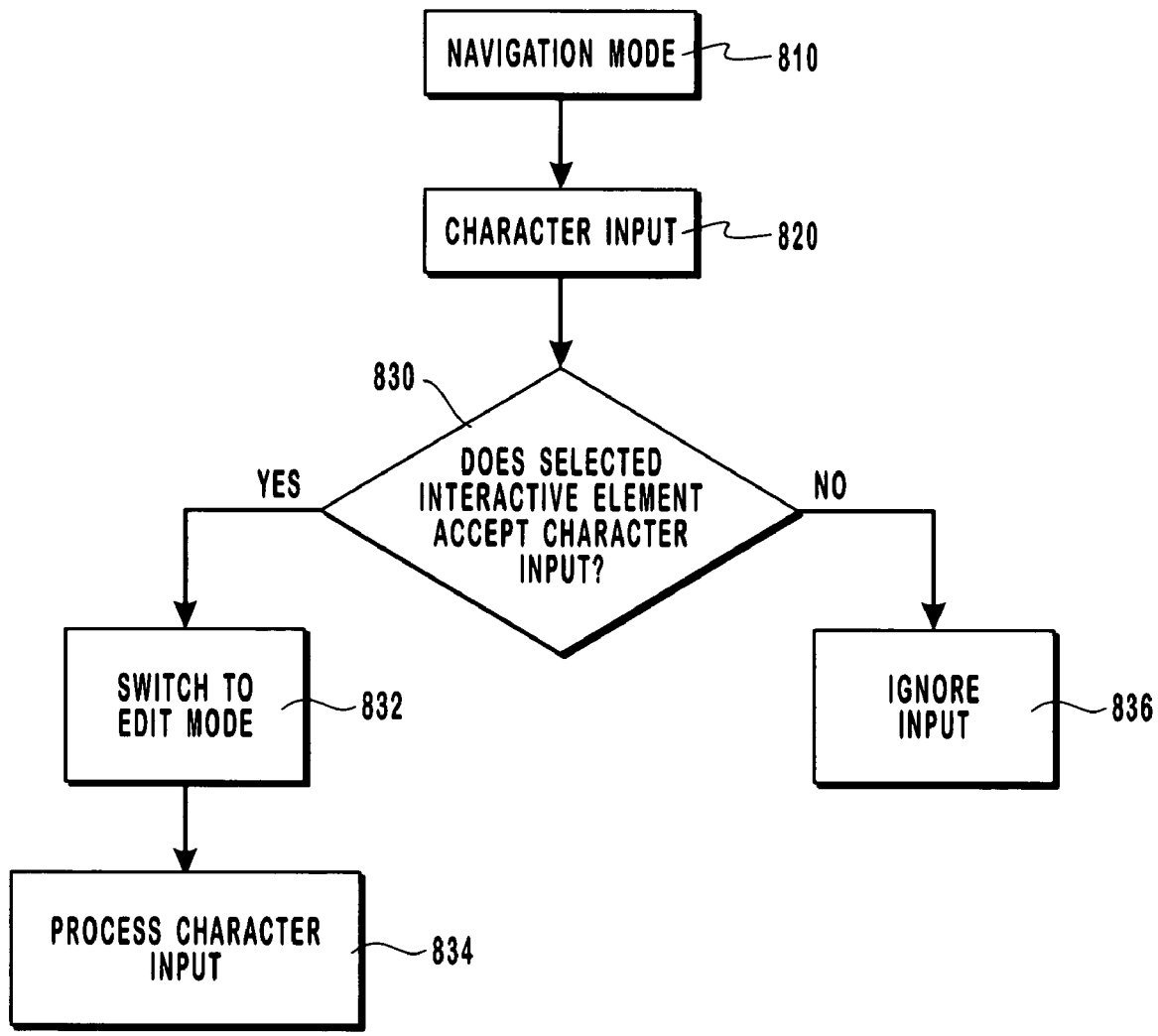
FIG. 8 is a flow diagram that corresponds to receiving a character input while navigating between interactive elements.

FIG. 8 is a flow diagram that corresponds to receiving a character input while navigating between interactive elements. During operation in navigation mode 810, a character input 820 is received. Character input may include numbers, letters, punctuation, white space, etc. If decision block 830 determines that the interactive element does not accept character input, character input 820 is ignored 836. Otherwise, character input 820 causes a switch from navigation mode to edit mode 832 and character input 820 is processed 834. For example, if the selected interactive element is a single line textbox 510 or a multiple line textbox 520, entering a letter while in navigation mode switches to edit mode and places the letter in the textbox. As indicated earlier, spinner 550 and picker 560 also may use character input to find an item in a long list by advancing to and/or choosing an item that matches the character entered.

Figure 9A:
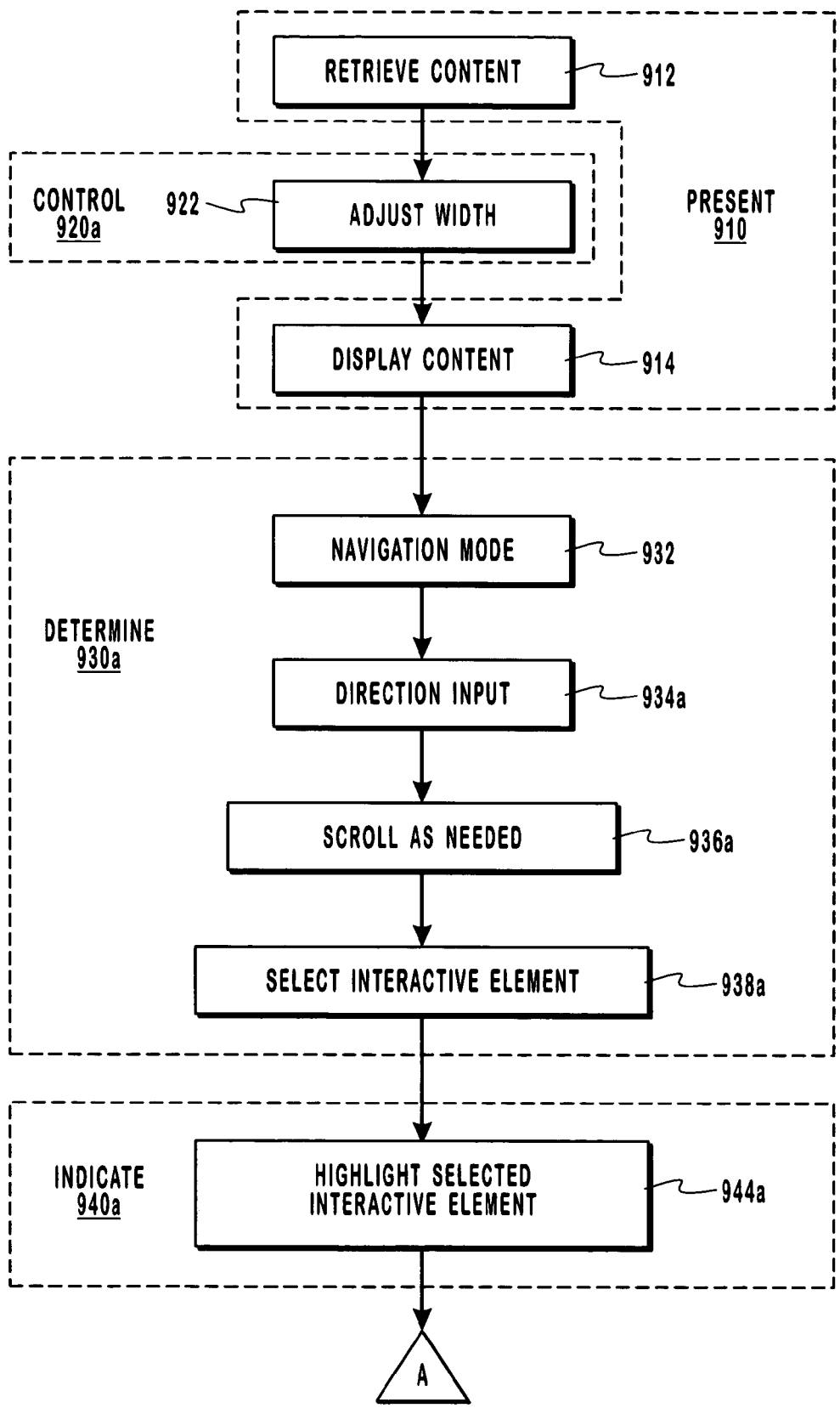
FIGS. 9A-9C show an exemplary method for browsing content according to the present invention.
Figure 9B:
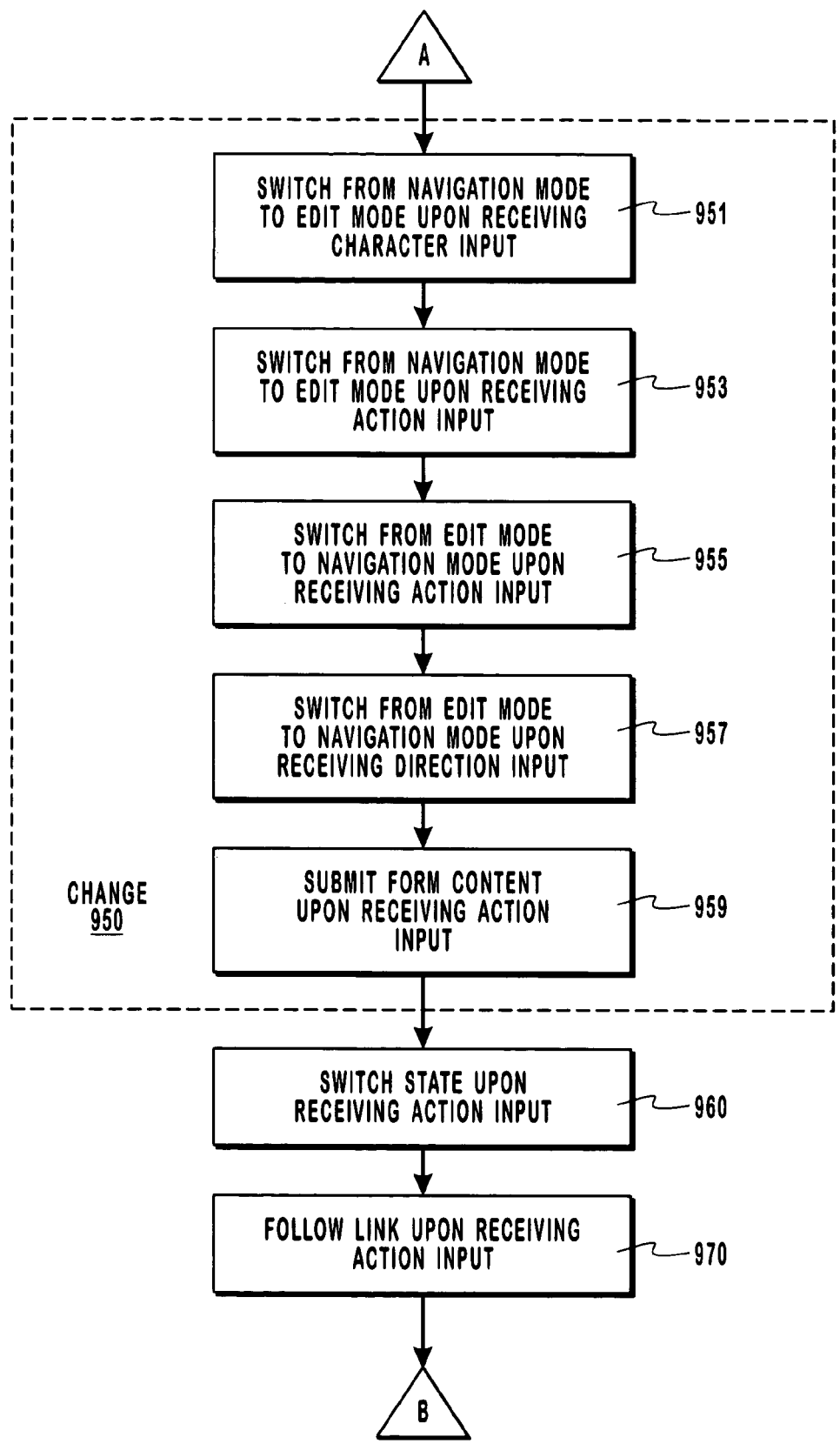
Figure 9C:
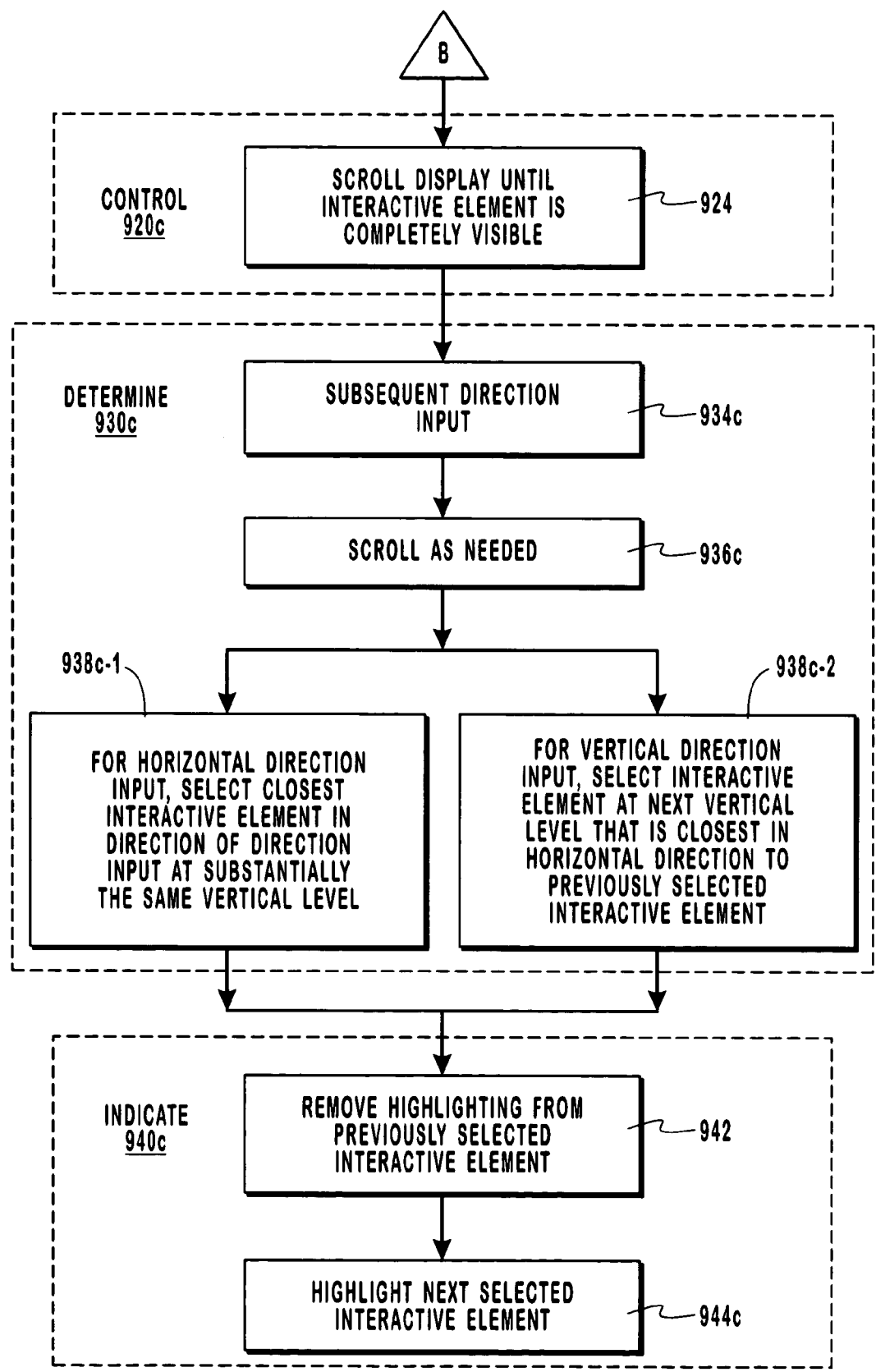

FIGS. 9A-9C show an exemplary method for browsing content according to the present invention. A step for presenting (910) at least a portion of content on the display area of a browsing system may include the acts of retrieving (912) the content and displaying (914) the retrieved content. The content may be retrieved from a local or remote source. A step for controlling the width (920*a*) of an interactive element may include the act of adjusting the width of the interactive element to the width of available display area on the browsing system if the width of the interactive element exceeds the width of available display area.

A step for determining (930*a*) an interactive element for selection based on a 2 direction input may include the following acts: an act of starting (932) in navigation mode by default when content displays; an act of receiving (934*a*) a direction input from a direction key, such as four-direction and action key 210 of FIG. 2; an act of scrolling (936*a*) the display of the content in the direction of the received direction input if less than all of the content is displayed and no interactive element is at least partially visible; and an act of selecting (938*a*) an interactive element based on the received direction input relative to a previously selected interactive element or, if no interactive element has been previously selected, based on the direction input relative to the beginning of the displayed content. Note that for English content, an up arrow or left arrow relative to the beginning of the display content does not make sense and therefore is ignored.

A step for indicating (940*a*) that an interactive element is selected may include the act of highlighting (944*a*) the interactive element. For example, a selection box may be placed around the interactive element or the visual appearance of the interactive element may be otherwise altered such that a selected interactive element is distinguishable from an interactive element that has not been selected. The present invention does not necessarily require any particular type of highlighting.

A step for changing (950) the mode of a browsing system may include an act of switching (951) from navigation mode to edit mode upon receiving a character input. For example, when an interactive element such as single line textbox 510, multiple line textbox 520, spinner 550, or picker 560 is selected, receiving a character input switches to edit mode. An act of switching (953) from navigation mode to edit mode upon receiving an action input also may be included as part of a step from changing (950) the mode of a browsing system. An action input is an explicit indication to switch modes, whereas a character input is an implied indication to switch modes.

Once in edit mode, a step for changing (950) the mode of a browsing system may include the act of switching (955) from edit mode to navigation mode upon receiving an action input. In other words, an action input may be used both for entering and exiting edit mode. Likewise, an act of switching (957) from edit mode to navigation mode upon receiving a direction input also may be included within a step form changing (950) the mode of a browsing system. For interactive elements that do not accept a particular direction input, such as an up or down arrow in a single line textbox, receiving the particular direction input switches from edit mode to navigation mode.

Additionally, a step for changing (950) the mode of a browsing system may include the act of submitting (959) form content upon receiving an action input. For content that does not include a submit button, an action input is associated with submitting the form. After submitting a form, the browsing system switches from edit mode to navigation mode because submitting a form usually causes new content to be displayed by a browsing device and, as described above, the browsing system may default to navigation mode as content initially displays.

Some types of interactive elements may operative intuitively without a dedicated edit mode and therefore switching modes may not be necessary for interacting with those elements. The present invention may include the act of switching (960) the state of a selected interactive element such as a radio button or checkbox. Similarly, the act of following (970) a selected link upon receiving an action input or executing the action (not shown) associated with a button also are within the scope of the present invention.

If selected interactive element is only partially visible, a step for controlling the width (920*c*) of an interactive element (see 920*a* of FIG. 9A) also may include the act of scrolling (924) the display area until the interactive element is completely visible. Automatically scrolling the display of content ordinarily occurs when switching from navigation mode to edit mode. Upon switching from navigation mode to edit mode, it becomes clear that a particular interactive element is of interest and should be completely visible, whereas in navigation mode, it may be unclear whether interest is in (i) an interactive element selected as a natural consequence of scrolling displayed content, or (ii) other content that becomes visible as content scrolls.

In addition to the acts described in connection with FIG. 9A, a step for determining (930*c*) an interactive element for selection based on a direction input may include other acts, such as an act of receiving (934*c*) a subsequent direction input. If less than all of the content is display and no interactive element is at least partially visible, determining (930*c*) an interactive element for selection also may include an act of scrolling (936*c*) the display of the content in the direction of the subsequent direction input. For a horizontal direction input, determining (930*c*) an interactive element for selection may include an act of selecting (938*c*-1) the closest interactive element in the direction of the direction input that is at substantially the same vertical level. For a vertical direction input, determining (930*c*) an interactive element for selection may include an act of selecting (938*c*-2) the interactive element at the next vertical level in the direction of the direction input that is closest in the horizontal direction to a previously selected interactive element. A step for indicating (940*c*) that an interactive element is selected may further include the acts of removing (942) the highlighting from a previously selected interactive element and highlighting (944*c*) the next selected interactive element (see also 940*a* of FIG. 9A).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computer program product for use in either a wireless telephone or personal digital assistant having a display area and input system, the input system including a direction key and an action key, wherein the input system and display area are limited as compared to a pointing device and larger display area often found in more traditional browsing systems, and wherein one or more interactive elements within content received from a content source may behave differently in a browsing context than the one or more interactive elements behave in an operating system shell context, the computer program product comprising one or more computer-readable storage media having stored computer-executable instructions for implementing a method of browsing content that contains one or more interactive elements, wherein the browsing includes an edit mode and a navigation mode, the method comprising acts of:
   starting in the navigation mode;
   displaying at least a portion of the content on the wireless telephone or personal digital assistant display area;
   receiving a direction input generated by the direction key of the wireless telephone or personal digital assistant;
   in a situation in which no interactive element is displayed as being visually selected on the display area, and while the direction input is being received, if less than all of the content is displayed and no interactive element is at least partially visible in the direction of the direction input relative to a previously selected interactive element or, if no interactive element has been previously selected, based on the direction input relative to the beginning of the displayed portion of the content, automatically scrolling the display of the content in the direction of the direction input;
   selecting an interactive element that is at least partially visible, the selection being based on the direction input relative to a previously selected interactive element or, if no interactive element has been previously selected, based on the direction input relative to the beginning of the displayed portion of the content, wherein said interactive element can be only partially visible; and
   placing a selection box around the interactive element to indicate that the interactive element is selected.

2. A computer program product as recited in claim 1, wherein the interactive element comprises one of a link, a single line textbox, a multiple line textbox, a spinner, a radio button, a checkbox, a button, and a picker.

3. A computer program product as recited in claim 1, wherein the interactive element accepts character input, the method further comprising an act of switching from navigation mode to edit mode upon receiving a character input.

4. A computer program product as recited in claim 1, wherein the interactive element accepts character input or allows for one or more items to be selected from a group of one or more items, the method further comprising an act of switching from navigation mode to edit mode upon receiving an action input.

5. A computer program product as recited in claim 1, wherein the method further comprises the acts of:
   browsing with the wireless telephone or personal digital assistant in edit mode; and
   switching from edit mode to navigation mode upon receiving an action input.

6. A computer program product as recited in claim 1, wherein the interactive element does not accept a direction input, the method further comprising the acts of:
   browsing with the wireless telephone or personal digital assistant in edit mode; and
   switching from edit mode to navigation mode upon receiving the direction input.

7. A computer program product as recited in claim 1, wherein the interactive element is part of form content that does not include a submit element, the method further comprising the acts of:
   browsing with the wireless telephone or personal digital assistant in edit mode; and
   submitting the form content upon receiving an action input.

8. A computer program product as recited in claim 1, wherein the interactive element is capable of representing two states, the method further comprising an act of switching from one state to the other upon receiving an action input while in navigation mode.

9. A computer program product as recited in claim 1, wherein the interactive element comprises a link, the method further comprising an act of following the link upon receiving an action input.

10. A computer program product as recited in claim 1, wherein the interactive element exceeds the width of available wireless telephone or personal digital assistant display area, the method further comprising an act of adjusting the width of the interactive element to be less than or equal to the width of available wireless telephone or personal digital assistant display area.

11. A computer program product as recited in claim 1, wherein the interactive element is only partially visible in the wireless telephone or personal digital assistant display area, the method further comprising acts of:
   adjusting the width of the interactive element to be less than or equal to the width of available wireless telephone or personal digital assistant display area if the width of the interactive element exceeds the width of available wireless telephone or personal digital assistant display area; and
   scrolling the wireless telephone or personal digital assistant display area until the interactive element is completely visible.

12. A computer program product as recited in claim 1, wherein the selected interactive element is a previously selected interactive element, the method further comprising the acts of:
   receiving a subsequent direction input that corresponds to scrolling the wireless telephone or personal digital assistant display area, the subsequent direction input being generated by activating a navigation key;

while the subsequent direction input is being received, if less than all of the content is displayed and no other interactive element is at least partially visible in the direction of the subsequent direction input, scrolling the display of the content in the direction of the subsequent direction input;

selecting a next interactive element that is at least partially visible, the selection being based on the subsequent direction input relative to the previously selected interactive element;

removing highlighting from the previously selected interactive element to indicate that the previously selected interactive element is no longer selected; and highlighting the next interactive element to indicate that the next interactive element is selected.

13. A computer program product for use in either a wireless telephone or personal digital assistant configured for browsing content received from a content source, and having a display area and input system that is limited as compared to pointing devices and displays often found in more traditional browsing systems, and wherein one or more interactive elements within content received from the content source may behave differently in a browsing context than the one or more interactive elements behave in an operating system shell context, the computer program product comprising one or more computer-readable storage media having stored computer-executable instructions for implementing a method of browsing content that includes one or more interactive elements, wherein the browsing includes an edit mode and a navigation mode, the method comprising steps for:

presenting at least a portion of the content on a display area of a browsing system, the content including at least one interactive element which is displayed in such a manner that it is only partially visible;

receiving a direction input generated by activating a navigation key;

upon receiving a direction input, determining that the interactive element, which is only partially visible, has been selected based on the direction input;

visually indicating that the interactive element, which is only partially visible, is selected; and automatically scrolling the browsing system upon determining that the interactive element has been selected and that the interactive element is only partially visible in the browsing system display area, wherein the browsing system display area is automatically scrolled until the entire interactive element becomes completely visible.

14. A computer program product as recited in claim 13, wherein the browsing system comprises one of a wireless telephone and a personal digital assistant.

15. A computer program product as recited in claim 13, wherein the interactive element comprises one of a link, single line textbox, a multiple line textbox, a spinner, a radio button, a checkbox, a button, and a picker.

16. A computer program product as recited in claim 13, further comprising a step for changing the mode of the browsing system.

17. A computer program product as recited in claim 13, wherein the interactive element is capable of representing two states, the method further comprising an act of switching from one state to the other upon receiving an action input while in navigation mode.

18. A computer program product as recited in claim 13, wherein the interactive element comprises a link, the method further comprising an act of following the link upon receiving an action input.

19. A computer program product as recited in claim 13, wherein the interactive element exceeds the width of available browsing system display area, the method further comprising a step for controlling the width of the interactive element.

20. A computer program product as recited in claim 13, wherein the step for determining an interactive element for selection based on a direction input comprises acts of:

receiving a direction input that corresponds to scrolling the browsing system display area, the direction input being generated by activating a navigation key;

while the direction input is being received, if less than all of the content is displayed and no interactive element is at least partially visible, scrolling the display of the content in the direction of the direction input; and selecting an interactive element that is at least partially visible, the selection being based on the direction input relative to a previously selected interactive element or, if no interactive element has been previously selected, based on the direction input relative to the beginning of the displayed portion of the content.

21. A computer program product for use in either a wireless telephone or personal digital assistant having a display area and input system that are limited as compared to a pointing device and larger display area often found in more traditional browsing systems, the computer program product comprising one or more computer-readable storage media having stored computer-executable instructions for implementing a method of browsing content that contains one or more interactive elements, the method comprising:

displaying at least a portion of content on the display area of either a wireless telephone or personal digital assistant;

receiving a direction input generated by the wireless telephone or personal digital assistant;

in a situation in which no interactive element is displayed as being visually selected on the display area, and while the direction input is being received, if less than all of the content is displayed and no interactive element is at least partially visible in the direction of the direction input relative to a previously selected interactive element or, if no interactive element has been previously selected, based on the direction input relative to the beginning of the displayed portion of the content, automatically scrolling the display of the content in the direction of the direction input;

selecting an interactive element that is only partially visible, the selection being based on the direction input relative to a previously selected interactive element or, if no interactive element has been previously selected, based on the direction input relative to the beginning of the displayed portion of the content, wherein said interactive element is only partially visible; and graphically indicating that the interactive element is selected.

* * * * *